Oct. 24, 1944.  E. W. AUSTIN  2,360,823
EXCAVATOR
Filed Feb. 11, 1942  2 Sheets-Sheet 1
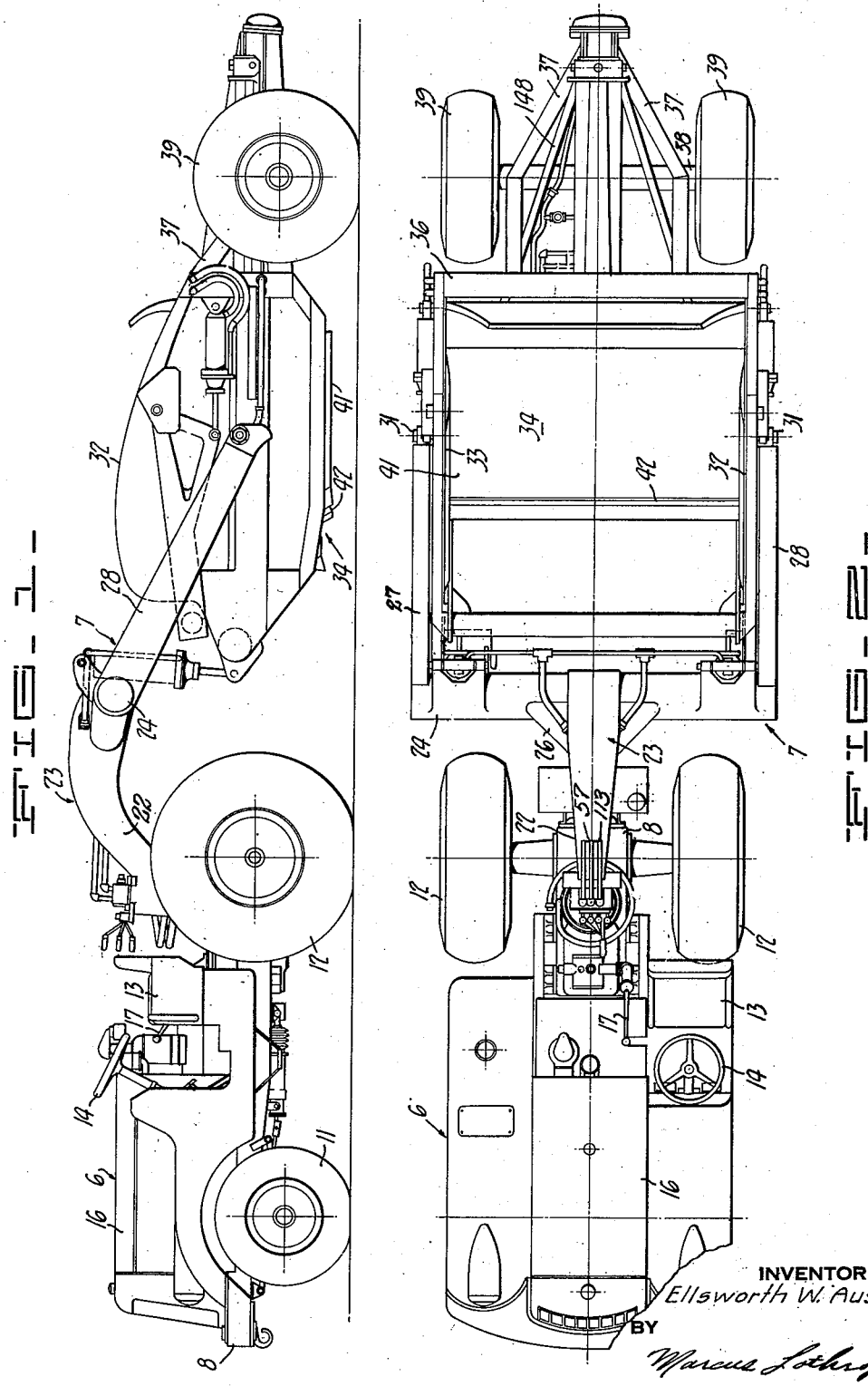
INVENTOR
Ellsworth W. Austin
BY
Marcus Lothrop

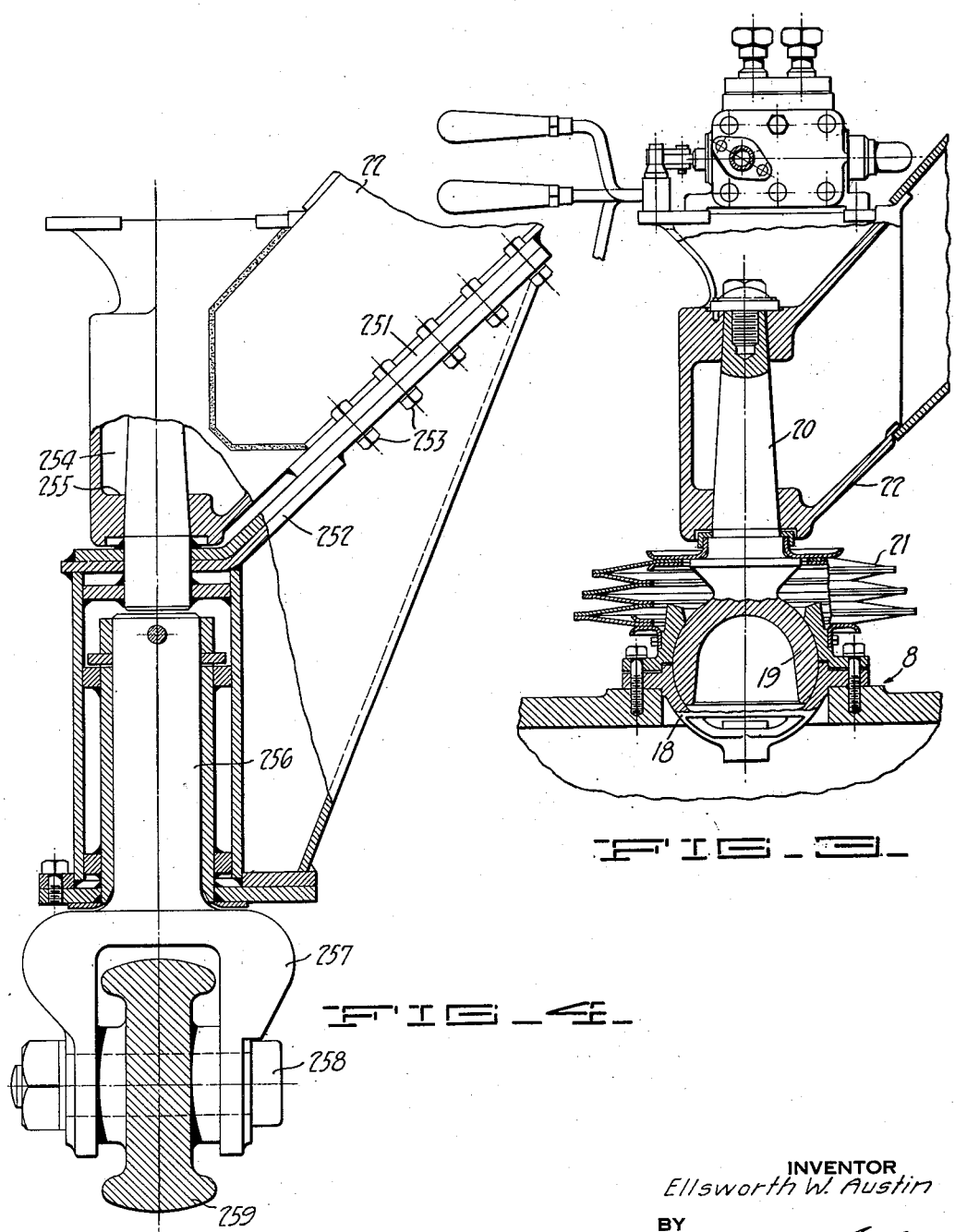

Patented Oct. 24, 1944

2,360,823

UNITED STATES PATENT OFFICE 2,360,823

EXCAVATOR

Ellsworth W. Austin, Cedar Rapids, Iowa, assignor to La Plant-Choate Mfg. Co., Inc., Cedar Rapids, Iowa, a corporation of Delaware Application February 11, 1942, Serial No. 430,335

5 Claims. (Cl. 37—124)

My invention relates to means for excavating, transporting and discharging material such as earth and is particularly concerned with an excavator which is primarily intended for use in connection with a tractor unit serving as a draft unit only or on which a part of the weight of the trailer excavating unit is borne. Under some circumstances the excavator is used by being drawn by the tractor, yet under other circumstances part of the weight is borne by the tractor unit. Both embodiments are particularly disclosed herein.

In general the object of my invention is to provide an excavator which can be used with a tractor unit which bears part of the load of the trailer unit or which serves simply as a towing vehicle.

The further object of this invention is the provision of a suitable pivotal connection between an excavator and tractor unit.

The foregoing and other objects of my invention are attained in the embodiment illustrated in the drawings, in which Fig. 1 is a side elevation of an excavator constructed in accordance with my invention.

Fig. 2 is a plan of the structure disclosed in Fig. 1.

Fig. 3 is a cross-section on a central vertical longitudinal plan of the connection between the trailer unit and the tractor unit in my excavator.

Fig. 4 is a view similar to Fig. 3 but disclosing a modified form of connection mechanism for use when the trailer unit is towed by a standard tractor.

In its preferred form the excavator of my invention comprises a tractor unit which has suitable ground-engaging members to be stable, connected to a trailer unit which in itself is unstable and is so connected with the tractor unit as to result in a stable assembly, the trailer unit being provided with earth excavating and carrying means as well as earth discharging means all arranged so that their effect upon the stability of the assembly is under the control of an operator located at an operator's station on the tractor unit.

In its preferred form the excavator of my invention includes a tractor unit, generally designated 6 and a trailer unit, generally designated 7, the trailer unit being an earth excavator and carrier. The tractor unit 6 is of any convenient type and preferably includes a frame 8 supported on the ground by a pair of front steering wheels 11 and a pair of rear driving wheels 12. The steering wheels are under the control of an operator disposed at an operator's station 13 by means of a steering wheel 14, and the rear wheels 12 are suitably driven from an engine within the engine compartment 16 under the control of the operator by a controller 17. The details of construction of the tractor unit 6 are not of concern herein, it being sufficient to note that the tractor itself is a stable self-supporting and self-propelled vehicle especially designed to operate over relatively rough terrain.

The tractor unit 6 is provided at a point on the frame 8 between the operator's station 13 and the rear wheels 12 with a socket 18 (Fig. 3) designed to receive a ball 19 which is mounted on the foremost portion of the trailer unit by a removable cone spindle 20. This ball is suitably confined in the socket for universal movement and the connection is protected by a shroud 21 of a flexible nature. The ball and socket connection serves as the articulated support for the forward portion of a goose neck 22 included as a portion of a draft frame, generally designated 23, of the trailer unit 7.

The draft frame comprises a hollow built up structure in which the goose neck 22 merges smoothly with a draft member 24 preferably of tubular nature which extends transversely in a generally horizontal plane for the full width of the vehicle. From the extremities of the draft member there extend rearwardly hollow draft beams 27 and 28, respectively. The trailing ends of the draft beams terminate in pivot connections 31 each being located at substantially the central part of the adjacent one of a pair of side walls 32 and 33, respectively, included in the main bowl, generally designated 34, of the trailer unit. The journals 31 are in transverse, horizontal alignment or are coaxial to permit a relative rotary or pivotal movement between the draft frame 23 and the main bowl 34 about a transverse axis.

The side walls 32 and 33 of the main bowl terminate rearwardly in a cross frame structure 36 which is fabricated or suitable box beams and channels and from which extends a pusher frame 37 similarly fabricated and connected to a dead axle 38 extending transversely to support a pair of rear wheels 39 which rotate about a transverse horizontal axis parallel to the axis of the journals 31.

Since the ball joint 19 permits motion between the draft frame 23 and the tractor unit 6 around an infinite plurality of axes, it can equally be said that motion is permitted between the tractor and trailer units about a transverse horizontal axis. When the tractor unit and trailer unit are disposed in line or in tandem, as shown in Figs. 1 and 2 for example, then if the main bowl 34 is raised and lowered by rotation around the axis of the rear wheels 39, such motion is accompanied by relative motion of the main draft frame 23 about two parallel transverse horizontal axes, one passing through the center of the ball 19 and the other being the axis of the journal 31.

While the tractor unit 6 is a stable structure and can itself operate without any connection to the trailer unit, the trailer unit itself is unstable since when the tractor 6 is not present it is not self supporting, and in addition because of the pivotal connection about the axis of the journal 31 the draft frame and the main bowl of the trailer unit are freely movable into a plurality of raised and lowered positions. In accordance with my invention, this instability is put to use under control of the vehicle operator.

Included in the main bowl is a bowl bottom, generally designated 41, provided along its leading edge with a cutting blade 42 designed to assist in freeing the material being excavated and in directing it into the main bowl 34. Motion of the main bowl in a vertical plane and about the rear wheel axis is therefore accompanied by corresponding raising and lowering motion of the cutting edge.

Although in Figures 1 and 2 the tractor and trailer units 6 and 7 have been illustrated in considerable detail in order properly to orient the pivotal connections more specifically shown in Figures 3 and 4, a detailed description of these units is here deemed inessential for the pivotal connection shown in Figures 3 and 4 and hereinafter claimed is in general independent of the type of tractor and trailer units used.

While as previously described the trailer unit is customarily attached to a tractor of the particular type disclosed, it is sometimes utilized behind a standard tractor having simply a drawbar connection. Under those circumstances, I preferably revise or modify the goose neck 22 of the draft frame so as to accommodate a standard front wheel dolly such as shown in the patent to Ellsworth W. Austin, Patent No. 2,329,448. Under such circumstances the goose neck 22 is provided with an extra reinforcing plate 251 (Fig. 4) to which an adapter fitting 252 is fastened by removable bolts 253. This fitting is primarily a housing the upper portion of which is contoured to fit beneath the goose neck 22 and within which is secured a fixed spindle 254 to take the place of the spindle 20 of the ball joint 19. The spindle 254 serves as a locating and clamping means when inserted into and fastened to the receiving socket 255 in the goose neck 22.

Journalled within the adapter 252 is a pivot pin 256 suitably fastened in place and held against end displacement. The pivot pin is forked at its lower end as at 257, to secure a longitudinal pivot bolt 258 mounted in an axle 259 on which ground-engaging wheels and a draft tongue are mounted in the customary fashion. By manipulating the bolts 253 and the spindle 254 the adapter connection can be utilized or not as desired and the ball joint 19 can be removed or installed depending upon the particular type of draft vehicle utilized with the trailer unit.

I claim:

1. An excavator comprising a main bowl, a draft frame connected to said main bowl, said draft frame including a goose neck, a plate on said goose neck, an adapter fitting having a spindle thereon, means for securing said spindle in said goose neck and said adapter to said plate, and a dolly journalled in said adapter.

2. An excavator comprising: a draft frame including a goose neck adapted to receive a spindle; an adapter having a spindle thereon; means for securing said spindle in fixed position in said goose neck; and a dolly including a vertical pin journaled in said adapter.

3. A vehicle comprising: a draft frame including a goose neck; a plate on said goose neck; an adapter fitting having a spindle thereon; means for securing said spindle in said goose neck and said adapter to said plate; and a dolly journaled in said adapter.

4. An excavator comprising: a main bowl; a draft frame connected to said main bowl, said draft frame including a goose neck adapted to receive a spindle; an adapter having a spindle thereon; means for securing said spindle in fixed position in said goose neck; and a dolly including a vertical pin journaled in said adapter.

5. A vehicle comprising: a draft frame including a goose neck; an adapter fitting having a spindle thereon; means for securing said spindle in said goose neck; and a dolly journaled in said adapter.

ELLSWORTH W. AUSTIN.